(12) United States Patent
Oden et al.

(10) Patent No.: US 8,261,949 B2
(45) Date of Patent: Sep. 11, 2012

(54) ADJUSTABLE-VOLUME LIQUID DISPENSING PUMP

(75) Inventors: Zillah Maria Oden, Houston, TX (US); Gordon E. Schutze, Manvel, TX (US); Kimberly A. Bennett, Waco, TX (US); Brian D. Schwab, Tigard, OR (US); Charles A. Ginnings, El Paso, TX (US); Megan E. Jeans, El Paso, TX (US); Catherine G. Ambrose, Houston, TX (US)

(73) Assignees: William Marsh Rice University; Baylor College of Medicine; The Board of Regents of the University of Texas System

( * ) Notice: Subject to any disclaimer, the term of this patent is extended or adjusted under 35 U.S.C. 154(b) by 793 days.

(21) Appl. No.: 12/028,560

(22) Filed: Feb. 8, 2008

(65) Prior Publication Data

US 2009/0200341 A1    Aug. 13, 2009

(51) Int. Cl.
*B65D 88/54* (2006.01)

(52) U.S. Cl. .................... 222/309; 222/321.7

(58) Field of Classification Search ........... 222/309, 222/231.7–321.9, 341
See application file for complete search history.

(56) References Cited

U.S. PATENT DOCUMENTS

| | | | | |
|---|---|---|---|---|
| 3,556,353 | A * | 1/1971 | Echols | 222/309 |
| 3,653,556 | A * | 4/1972 | Moran et al. | 222/309 |
| 3,940,027 | A | 2/1976 | Marterer | |
| 4,246,898 | A * | 1/1981 | Travalent et al. | 604/210 |
| 4,275,729 | A * | 6/1981 | Silver et al. | 604/211 |
| 4,286,736 | A * | 9/1981 | Corsette | 222/153.13 |
| 4,458,832 | A | 7/1984 | Corsette | |
| 4,654,035 | A * | 3/1987 | Ando | 604/210 |
| 4,856,677 | A * | 8/1989 | Brunet et al. | 222/94 |
| 5,016,780 | A | 5/1991 | Moretti | |
| 5,307,962 | A * | 5/1994 | Lin | 222/321.9 |
| 5,344,409 | A * | 9/1994 | Ennis et al. | 604/210 |
| 5,826,756 | A * | 10/1998 | Foster | 222/321.3 |
| 5,881,716 | A | 3/1999 | Wirch et al. | |
| 6,045,008 | A * | 4/2000 | Gonzalez Fernandez et al. | 222/153.13 |
| 6,135,325 | A | 10/2000 | Fessel et al. | |
| 6,250,154 | B1 * | 6/2001 | Cheresko | 73/426 |
| 6,257,458 | B1 * | 7/2001 | Green | 222/321.9 |
| 6,308,865 | B1 * | 10/2001 | Lin | 222/153.13 |
| 6,672,486 | B2 * | 1/2004 | Santagiuliana | 222/207 |
| 6,685,062 | B1 * | 2/2004 | Ki | 222/321.7 |
| 6,695,175 | B2 * | 2/2004 | Martin et al. | 222/309 |
| 6,739,480 | B1 | 5/2004 | Albrecht et al. | |
| 6,890,162 | B2 * | 5/2005 | Ding | 417/572 |
| 6,938,504 | B2 | 9/2005 | Camenisch | |
| 6,997,358 | B2 | 2/2006 | Wass | |
| 7,819,291 | B2 * | 10/2010 | Schulte et al. | 222/321.9 |

* cited by examiner

*Primary Examiner* — Lien Ngo

(57) ABSTRACT

An adjustable-volume liquid dispenser is disclosed. In one embodiment, an adjustable-volume liquid dispenser includes a spout and a plunger secured to the spout. The dispenser further includes a plunger lock moveable lengthwise along the plunger. The plunger lock is securable to the plunger at a plurality of positions on the plunger to adjust a volume of liquid to be dispensed. The dispenser also includes a spring in contact with the plunger. In addition, the dispenser includes a chamber comprising an interior for containing liquid. The plunger is slidably arranged with the chamber. A portion of the plunger is disposed within the chamber. Moreover, the dispenser includes a chamber cap secured to the chamber, and a valve disposed within the chamber. The dispenser also includes a shaft secured to the chamber.

20 Claims, 6 Drawing Sheets

ADJUSTABLE-VOLUME LIQUID DISPENSING PUMP

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention relates to the field of liquid dispensers and more specifically to liquid dispensers that dispense liquids in a range of specific volumes.

2. Background of the Invention

Liquid dispensers are widely used for a variety of applications such as dispensing medications. Conventional liquid dispensers for medications include syringes. Drawbacks to syringes include possible application of improper doses. For instance, a care-giver or the patient may apply an improper dose to the patient. An overdose of the medication may cause unwanted side effects, and an insufficient dose may not attain the desired effect. Additional drawbacks include inability of conventional syringes to be attached to liquid containers. Further drawbacks may include the need for visual acuity, manual dexterity, and an understanding of the importance of accurate dosing by the applier of the dose. Liquid dispensers with spouts have been developed for attachment to liquid containers. However, drawbacks to typical dispensers with spouts also include improper dosing to patients.

Consequently, there is a need for an improved liquid dispenser for applying proper doses. A further need includes an improved liquid dispenser that dispenses pre-set volumes of liquid.

BRIEF SUMMARY OF SOME OF THE PREFERRED EMBODIMENTS

These and other needs in the art are addressed in one embodiment by an adjustable-volume liquid dispenser that includes a spout and a plunger secured to the spout. The dispenser further includes a plunger lock moveable lengthwise along the plunger. The plunger lock is securable to the plunger at a plurality of positions on the plunger to adjust a volume of liquid to be dispensed. The dispenser also includes a spring in contact with the plunger. In addition, the dispenser includes a chamber comprising an interior for containing liquid. The plunger is slidably arranged with the chamber. A portion of the plunger is disposed within the chamber. Moreover, the dispenser includes a chamber cap secured to the chamber, and a valve disposed within the chamber. The dispenser also includes a shaft secured to the chamber.

In another embodiment, these and other needs in the art are addressed by an adjustable-volume liquid dispenser. The dispenser includes a spout and a plunger secured to the spout. The dispenser also includes a spacer ring disposed on the plunger. In addition, the dispenser includes a spring in contact with the plunger. Moreover, the dispenser includes a chamber comprising an interior for containing liquid. The plunger is slidably arranged with the chamber. A portion of the plunger is disposed within the chamber. The dispenser further includes a chamber cap secured to the chamber, and a valve disposed within the chamber. The dispenser also includes a shaft secured to the chamber.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
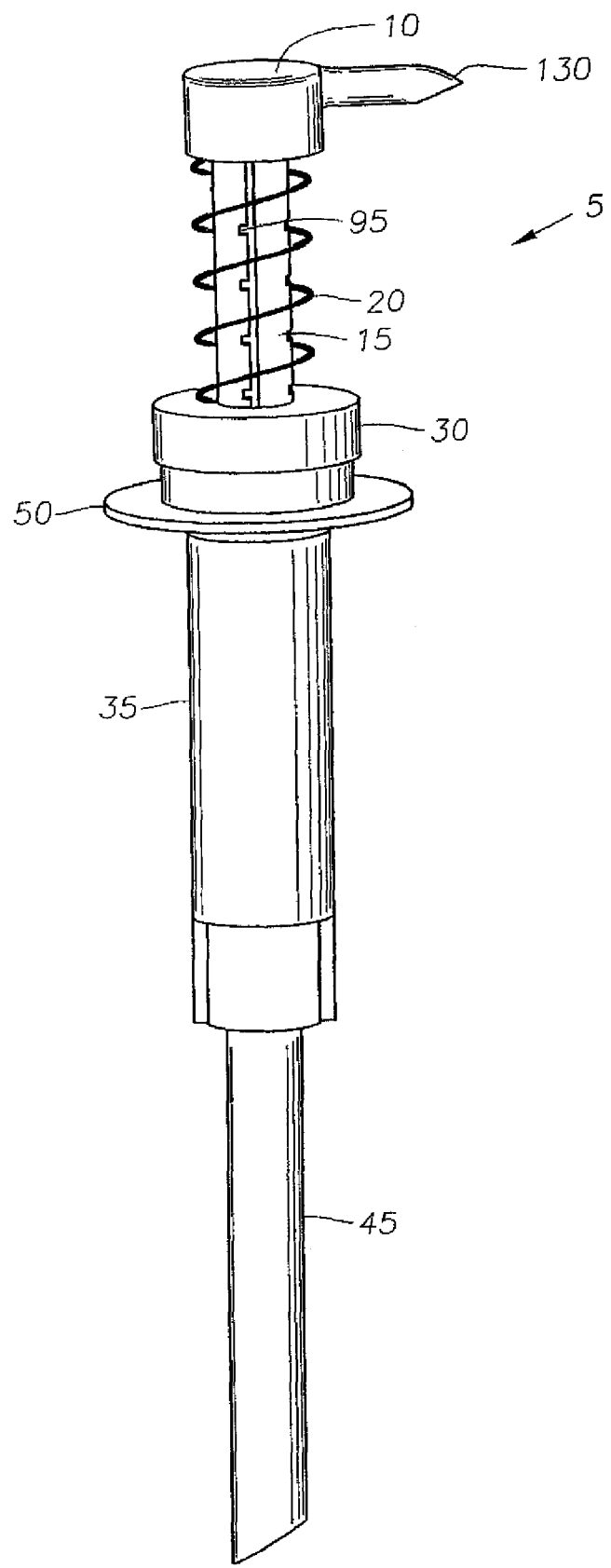
FIG. 1 illustrates a perspective view of an adjustable-volume liquid dispenser.

FIG. 1 illustrates an adjustable-volume liquid dispenser 5 that includes spout 10, plunger 15, spring 20, chamber cap 30, chamber 35, and shaft 45. In an embodiment, adjustable-volume liquid dispenser 5 is suitable for dispensing set volumes of liquid. The liquid may be any desired liquid. Without limitation, examples of suitable liquids include medications, chemicals, water, soap, lotion, food products, and the like. In an embodiment, the liquid is a medication. The liquids may have any suitable compositions and viscosities for use with adjustable-volume liquid dispenser 5. Without limitation, adjustable-volume liquid dispenser 5 allows repeatable, fixed volumes of liquid to be dispensed.

Figure 2:
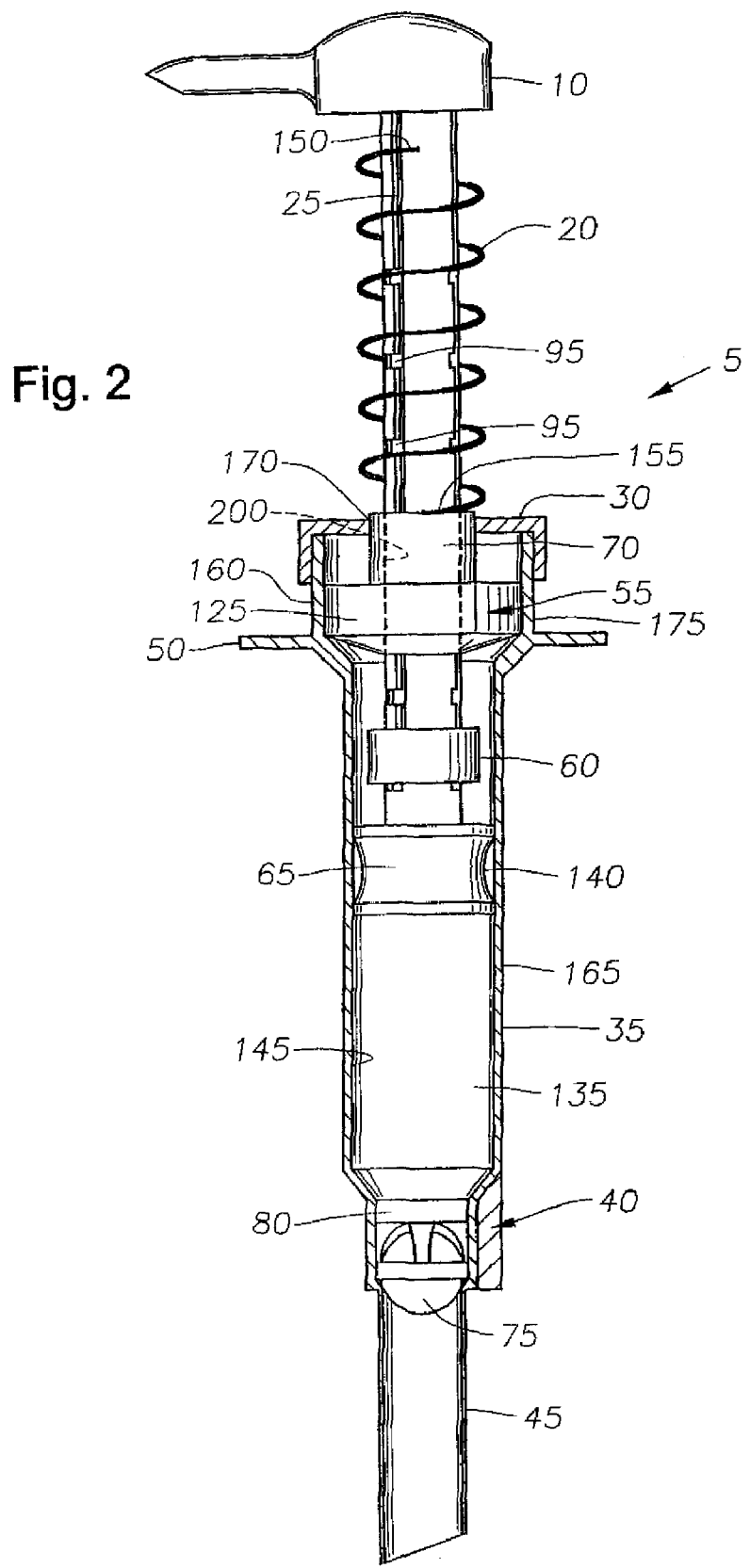
FIG. 2 illustrates a side view of an adjustable-volume liquid dispenser with a plunger having grooves.

As illustrated in FIG. 1 spout 10 may include any spout suitable for dispensing a liquid and for attaching to plunger 15. It is to be understood that spout 10 is not limited to the configuration shown in FIG. 1 but instead may include any configuration suitable for dispensing a liquid and for attaching to plunger 15. In an embodiment, spout 10 has at least one pathway (not illustrated) by which the liquid passes from plunger 15 through spout 10. In the embodiment illustrated in FIG. 1, spout 10 has dispensing end 130 through which liquid may exit spout 10. Spout 10 may be attached to plunger 15 by any suitable method. For instance spout 10 may be attached to plunger 15 by press-fit, adhesive, threaded fastening, and the like. Plunger 15 may have any configuration suitable for allowing plunger 15 to be pushed into chamber 35 to expel liquid from chamber 35. In the embodiment as illustrated in FIG. 2, plunger 15 is a shaft with at least one orifice (not illustrated) that allows liquid to pass from chamber 35 through plunger 15 to spout 10. In an embodiment as illustrated in FIG. 2, plunger 15 extends into chamber 35 through chamber cap 30 and collar 55. It is to be understood that chamber 35 is illustrated in FIG. 2 in a cross-sectional view for illustration purposes only. Chamber cap 30 is secured to top 160 of chamber 35. Chamber cap 30 may be secured to chamber 35 by any suitable means such as by press-fit, threaded fastening, and the like. As illustrated in FIG. 2, collar 55 has an orifice 200 that extends through collar 55 with plunger 15 passing through orifice 200. Orifice 200 has a diameter suitable for allowing plunger 15 to pass through collar 55 but also has a sufficient diameter to prevent any unwanted lateral movement of plunger 15. In some embodiments, orifice 200 has a diameter suitable for maintaining movement of plunger 15 in a direction parallel to sides 165 of chamber 35. Collar 55 may have any suitable configuration and diameter to prevent collar 55 from moving into interior 135. For instance, in an embodiment as illustrated in FIG. 2, collar 55 has collar neck 70 and collar base 125. In some embodiments, collar neck 70 may facilitate prevention of any unwanted lateral movement of plunger 15 and may also control the distance plunger 15 may be displaced, which may control the amount of liquid dispensed. In an embodiment, collar neck 70 has a configuration suitable for interfacing with chamber cap 30 with at least a portion of collar neck 70 disposed within chamber 35. In an embodiment as illustrated in FIG. 2, chamber cap 30 is secured to chamber 35 with a portion of collar neck 70 extending through chamber cap opening 170 and out of chamber 35. Chamber cap 30 prevents movement of collar 55 out of chamber 35. In addition, collar base 125 has a diameter sufficient to prevent collar 55 from moving into interior 135. In some embodiments as illustrated in FIG. 2, chamber 35 has collar portion 175 with a diameter greater than that of interior 135. Collar base 125 has a diameter sufficient for positioning in collar portion 175 but has a diameter sufficiently larger than the diameter of interior 135 to prevent movement of collar 55 into interior 135. In alternative embodiments (not illustrated), collar 55 and chamber cap 30 are not separate components, but chamber cap 30 is an integral component of collar 55.

As further illustrated in FIG. 2, plunger 15 has plunger base 65 disposed on the end of plunger 15 distal to spout 10 with plunger base 65 disposed in interior 135 of chamber 35. Plunger base 65 has any design suitable to substantially prevent liquid in chamber 35 from passing between exterior surface 140 of plunger base 65 and interior surface 145 of chamber 35. In an embodiment, plunger base 65 has an orifice (not illustrated) through which liquid may pass from chamber 35 to the pathway of plunger 15.

Figure 3:
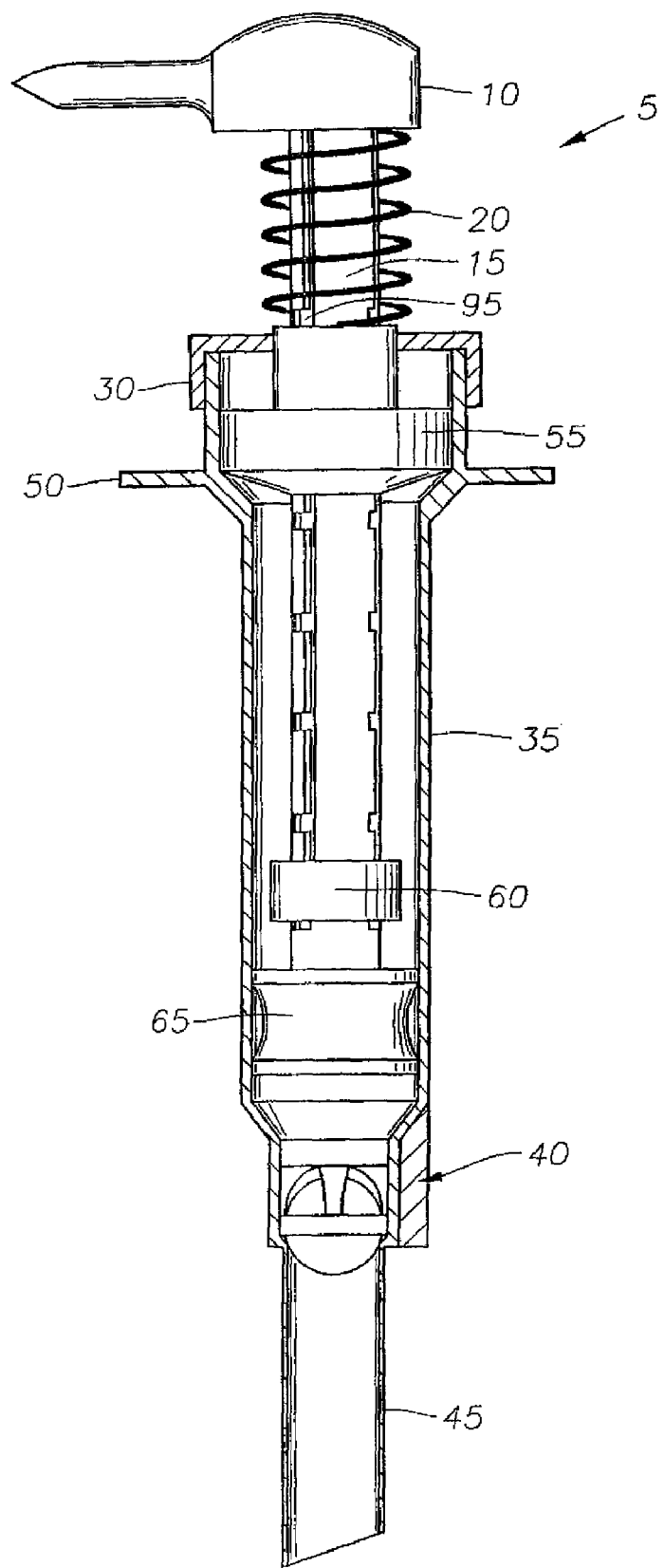
FIG. 3 illustrates a side view of the adjustable-volume liquid dispenser of FIG. 2 with a depressed spout.

FIG. 1 illustrates an embodiment in which adjustable-volume liquid dispenser 5 has spring 20 disposed about the exterior of plunger 15 between spout 10 and chamber cap 30. Without being limited by theory, spring 20 disposed outside of chamber 35 may prevent direct contact of spring 20 with the liquid. Spring 20 may be suitably positioned on plunger 15 to allow plunger 15 to return to a desired extended position after a depressing force is removed from spout 10. For instance, FIG. 2 illustrates an embodiment in which plunger 15 is in a non-depressed position, and FIG. 3 illustrates an embodiment in which plunger 15 has been depressed with compression of spring 20. Spring 20 may include any spring suitable for use with adjustable-volume liquid dispenser 5 and for returning plunger 15 to a desired extended position. In some embodiments, spring 20 is a helical spring. Spring 20 may also be composed of any material suitable for a desired use. In some embodiments, spring 20 is selected based upon a desired material composition of spring 20 (e.g., rust-resistant), desired mechanical properties (e.g., a desired stiffness), and/or properties of the liquid (e.g., viscosity of the liquid). In an embodiment as illustrated in FIG. 1, spring 20 has ends 150, 155 with end 150 proximate to spout 10 and end 155 proximate to chamber 35. In alterative embodiments (not illustrated), spring 20 may be disposed inside chamber 35. In such an alternative embodiment, spring 20 is disposed between plunger base 65 and valve 40 and may force plunger 15 up through chamber 35 when spring 20 de-compresses after liquid has been dispensed, and force is removed from plunger 15. Further, in such alternative embodiments, spring 20 may be composed of any material that is non-reactive to the liquid.

Figure 4:
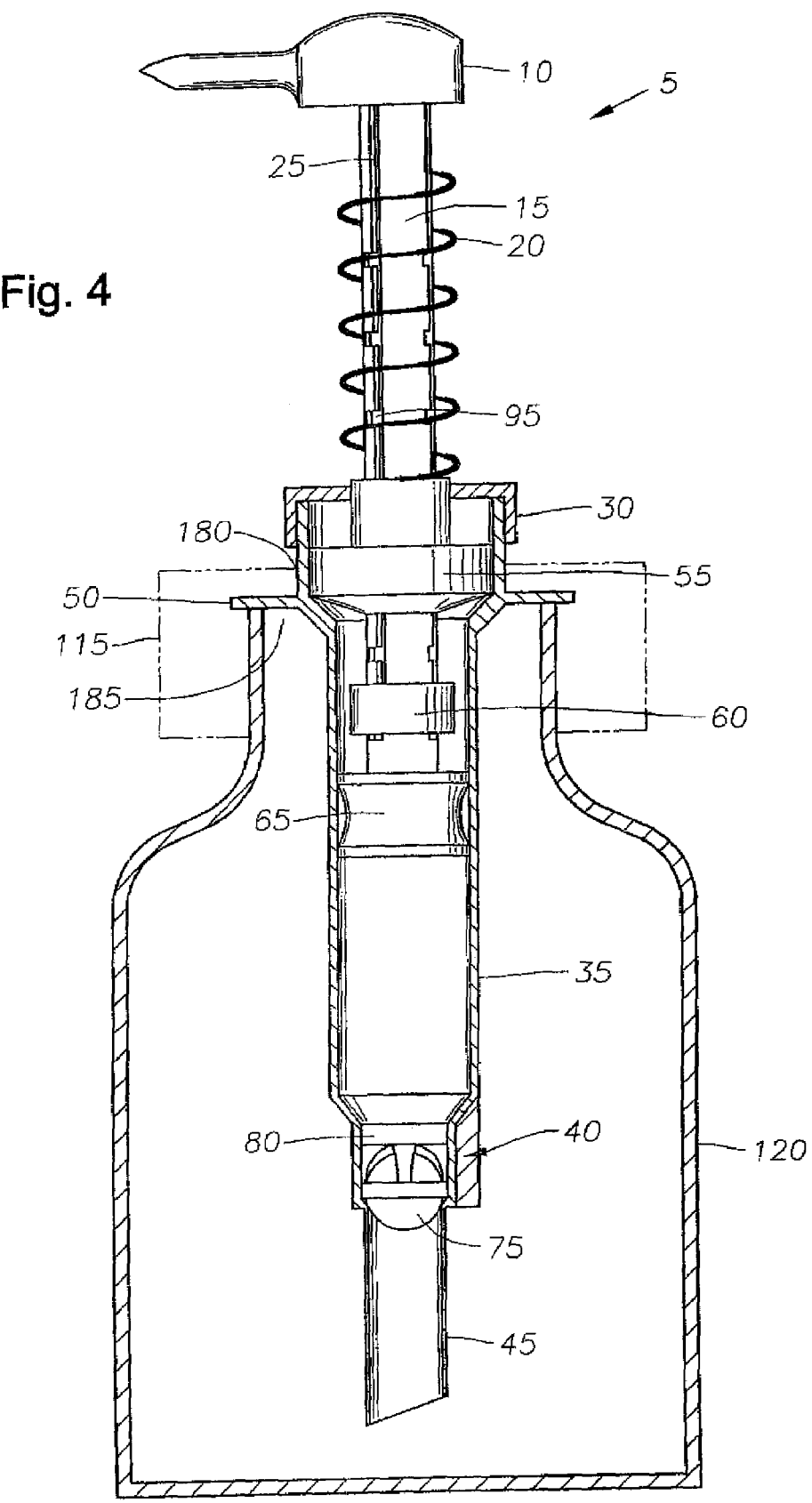
FIG. 4 illustrates a side view of an adjustable-volume liquid dispenser secured to a liquid container.

As illustrated in FIGS. 1 and 2, chamber 35 may have any size suitable for a desired amount of liquid to be contained. Chamber 35 may be composed of any material suitable for use with a desired liquid. For instance, chamber 35 may be glass, plastic, or the like. In some embodiments, chamber 35 includes chamber ledge 50. Chamber ledge 50 has a sufficient length to facilitate attachment of adjustable-volume liquid dispenser 5 to a liquid container. For instance, in an embodiment as illustrated in FIG. 4, liquid container cap 115 with liquid container cap orifice 180 is attached to liquid container 120. It is to be understood that liquid container cap 115 and liquid container 120 are shown in cross-sectional view for illustration purposes only. Liquid container cap 115 may secure adjustable-volume liquid dispenser 5 to liquid container 120. Liquid container cap 115 is removeably attached to liquid container 120 and may be attached to liquid container 120 by any suitable means. Chamber ledge 50 facilitates the attachment of adjustable-volume liquid dispenser 5 to liquid container 120. For instance, chamber ledge 50 prevents unwanted movement of chamber 35 through liquid container cap orifice 180 and out of liquid container 120. In an embodiment as illustrated in FIG. 4, chamber ledge 50 may have a diameter greater than that of container opening 185 to allow adjustable-volume liquid dispenser 5 to be disposed upon container opening 185 with liquid container cap 115 securing adjustable-volume liquid dispenser 5 to liquid container 120. In alternative embodiments (not illustrated), adjustable-volume liquid dispenser 5 does not have chamber ledge 50. In some alternative embodiments (not illustrated), adjustable-volume liquid dispenser 5 includes a substantially rigid cap or an elastic cap instead of chamber ledge 50, with the cap disposed at a location on the exterior of adjustable-volume liquid dispenser 5 between chamber cap 30 and shaft 45. In other alternative embodiments (not illustrated), adjustable-volume liquid dispenser 5 may be secured to liquid container 5 by adhesion, threading, by adhesion or threading into a cap with the cap adhered or threaded into container opening 185, or any other suitable method. In such other alternative embodiments, adjustable-volume liquid dispenser 5 may or may not include chamber ledge 50.

As illustrated in FIGS. 1-4, adjustable-volume liquid dispenser 5 also includes shaft 45. Shaft 45 is secured to chamber 35 distal to spout 10. As illustrated in FIG. 4, shaft 45 extends into liquid container 120. Shaft 45 may have any diameter and/or length sufficient to allow liquid to be drawn into chamber 35. Shaft 45 may be secured to chamber 35 by any suitable means.

Figure 5:
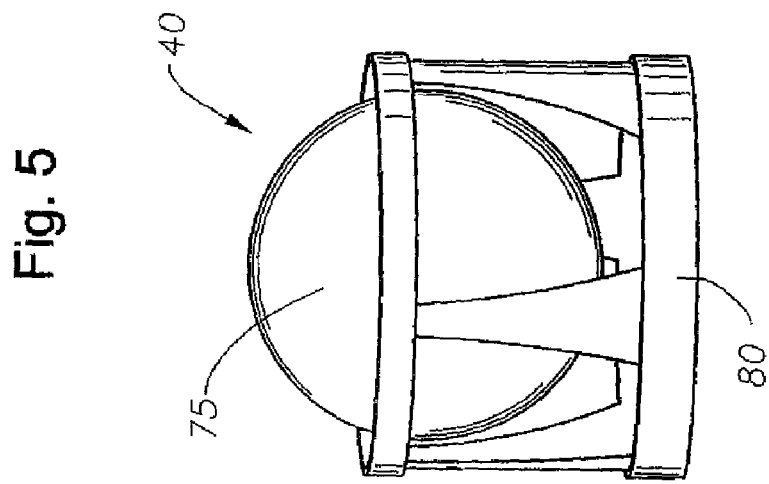
FIG. 5 illustrates a ball valve.

In an embodiment of the operation of adjustable-volume liquid dispenser 5 as illustrated in FIGS. 1-4, chamber 35 of adjustable-volume liquid dispenser 5 is placed within liquid container 120, which contains a desired liquid. Shaft 45 is sufficiently submersed in the liquid to allow liquid to be drawn into chamber 35. Liquid container cap 115 is attached to liquid container 120 to secure adjustable-volume liquid dispenser 5 to liquid container 120. In some embodiments, spout 10 is passed through liquid container cap orifice 180 when attaching liquid container cap 115 to liquid container 120. In other embodiments, spout 10 is removeably attached to plunger 15 and liquid container cap 115 is passed over plunger 15 with spout 10 removed. Chamber 35 has a valve 40 that controls the flow of liquid into and out of chamber 35 from liquid container 120. Liquid may be drawn into chamber 35 by applying a force to spout 10 to depress plunger 15 into chamber 35 and removing the force to allow spring 20 to de-compress and return plunger 15 to about its original position. Valve 40 may be any valve suitable for use with adjustable-volume liquid dispenser 5. In an embodiment, valve 40 is a one-way flow valve. For instance, valve 40 may be a ball valve. In an embodiment as illustrated in FIGS. 2-4, valve 40 is a ball valve. FIG. 5 illustrates an embodiment in which valve 40 is a ball valve including ball 75 and cage 80. Cage 80 includes any suitable configuration for disposition within chamber 35 in a manner to prevent ball 75 from entering interior 135. Ball 75 is disposed within cage 80 and has a greater diameter than that of shaft 45. Valve 40 may be secured in chamber 35 by any suitable means such as by press-fit. In operation, when plunger 15 is not depressed, liquid and/or air in liquid container 120 cannot enter chamber 35 because ball 75 is held in place over shaft 45 by gravity. When a force is applied to adjustable-volume liquid dispenser 5 and plunger 15 is depressed, downward pressure is applied to ball 75, which further facilitates holding ball 75 is place over shaft 45 and preventing liquid and/or air from entering chamber 35 from liquid container 120. FIG. 3 illustrates an embodiment of depressed plunger 15 with compressed spring 20. In an embodiment in which an upward force is applied to plunger 15 (e.g., by spring 20) and plunger 15 is pulled back through chamber 35, a vacuum is created in interior 135, and ball 75 moves out of place over shaft 45 to allow liquid to flow into chamber 35 around ball 75. The vacuum created by the movement of plunger 15 away from valve 40 draws liquid into interior 135. It is to be understood that cage 80 prevents movement of ball 75 into interior 135. When upward movement of plunger 15 through chamber 35 stops, ball 75 settles back in place over shaft 45 and prevents further liquid and/or air from entering chamber 35 and also prevents liquid from flowing back out of chamber 35 into liquid container 120. It is to be understood that de-compression of spring 20 provides the upward force to plunger 15 that provides the upward movement of plunger 15 through chamber 35 and away from valve 40. It is to be understood that depression of plunger 15 causes plunger base 65 to pass down through chamber 35 in the direction of valve 40, which increases pressure within interior 135 and forces liquid within interior 135 to flow through the orifice of plunger base 65 to the pathway of plunger 15 and then through the pathway of spout 10 and out of spout 10 via dispensing end 130.

Figure 7:
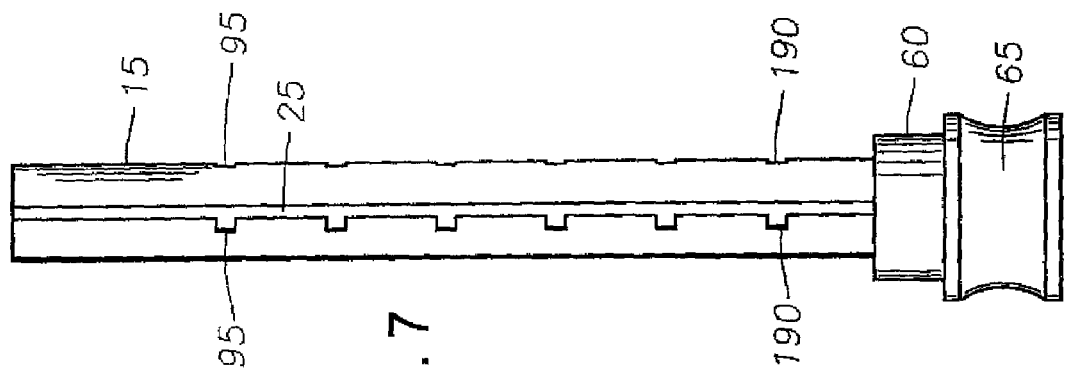
FIG. 7 illustrates a side view of a plunger and plunger lock.
Figure 6:
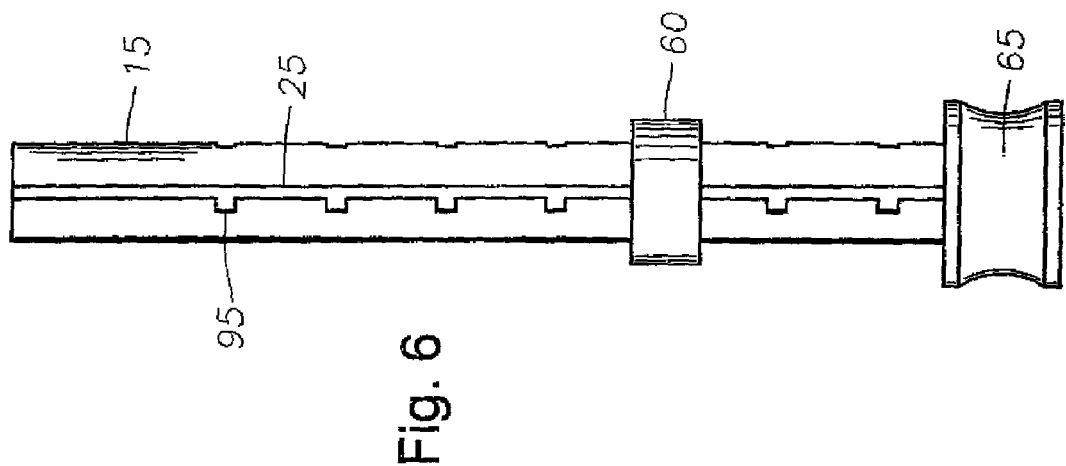
FIG. 6 illustrates a side view of a plunger and plunger lock.
Figure 10:
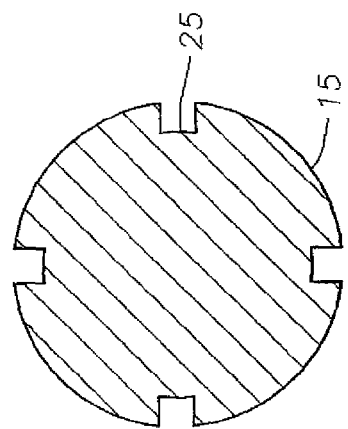
FIG. 10 illustrates a top view of a plunger with grooves.
Figure 8:
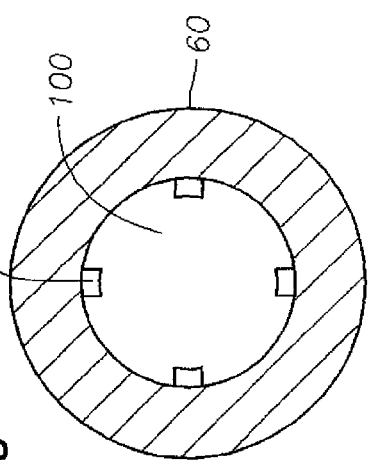
FIG. 8 illustrates a top view of a plunger lock with tabs.
Figure 9:
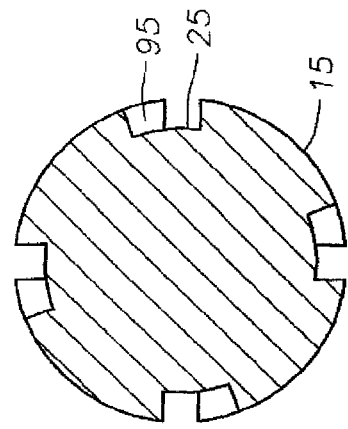
FIG. 9 illustrates a top cross sectional view of a plunger with grooves and groove indentions.

The maximum amount of liquid to be dispensed from adjustable-volume liquid dispenser 5 is pre-set. For instance, in an embodiment as illustrated in FIGS. 1-4, plunger lock 60 and plunger 15 having grooves 25 allow the amount of liquid dispensed in one depression to be pre-set. Grooves 25 may have any configuration, depth, and length suitable for locking plunger lock 60. FIG. 6 illustrates an embodiment of plunger 15 in which plunger lock 60 is set to a desired position, and FIG. 7 illustrates an embodiment of plunger 15 in which plunger lock 60 not set to a desired position. As shown, plunger 15 has a series of grooves 25 with groove indentions 95 notched in the exterior surface of plunger 15. The groove indentions 95 are placed at lengthwise positions on plunger 15 that represent a corresponding amount of liquid that may be contained within interior 135 and dispensed through spout 10. Without limitation and for example, each lengthwise position of groove indentions 95 on plunger 15 may represent a one milliliter amount of liquid to be dispensed. Therefore, securing plunger lock 60 at position 190 in such an example may dispense five milliliters of liquid. It is to be understood that each lengthwise position may have any suitable number of groove indentions 95. For instance, FIG. 9 illustrates a cross sectional top view of an embodiment of plunger 15 in which a position on plunger 15 has four grooves 25 and four corresponding groove indentions 95. Plunger lock 60 may be secured at each lengthwise position on plunger 15 by tabs 90. In an embodiment, plunger lock 60 has a number of tabs 90 (e.g., four) that corresponds to the number of grooves 25. For instance, in the embodiments as illustrated in FIG. 6-10, plunger lock 60 may be moved lengthwise along plunger 15 from the position illustrated in FIG. 7 to the lengthwise position illustrated in FIG. 6. Grooves 25 extend lengthwise along plunger 15. FIG. 10 illustrates a top view of plunger 15 having grooves 25 running lengthwise along plunger 15. Tabs 90 are suitably configured for disposition within grooves 25. It is to be understood that plunger 15 passes through plunger lock opening 100 as plunger lock 60 is moved lengthwise along plunger 15 with each tab 90 disposed within a corresponding groove 25. When plunger lock 60 is at a lengthwise position of groove indentions 95 representing a desired amount of liquid to be expelled, plunger lock 60 is twisted to the side to move tabs 90 sufficiently into the corresponding groove indention 95 to lock plunger lock 60 in place and prevent further lengthwise movement until plunger lock 60 is twisted to move tabs 90 out of groove indentions 95. Therefore, when spring 20 de-compresses and pushes plunger 15 out of chamber 35, plunger lock 60 is locked in place and stops the movement of plunger 15 out of chamber 35 when plunger lock 60 contacts collar 55. The tension of spring 20 prevents downward movement of plunger 15 until a sufficient force is applied to plunger 15. In an embodiment in which a total amount of liquid desired to be expelled through spout 10 is an amount larger than chamber 35 may hold, plunger lock 60 may be locked at a suitable lengthwise position on plunger 15 to minimize the amount of compressions of plunger 15 that are needed to obtain the desired liquid amount to be dispensed (e.g., the desired dosage amount). For example and without limitation, plunger 15 has groove indentions 95 at five lengthwise positions with each position representing a milliliter to be dispensed. A desired dosage of the liquid (e.g., medicine) is eight milliliters. Because in such an example chamber 35 may only dispense five milliliters total, plunger lock 60 may be locked at a position representing a four milliliter dosage, which may provide the desired amount of eight milliliters by two depressions of plunger 15.

Figure 11:
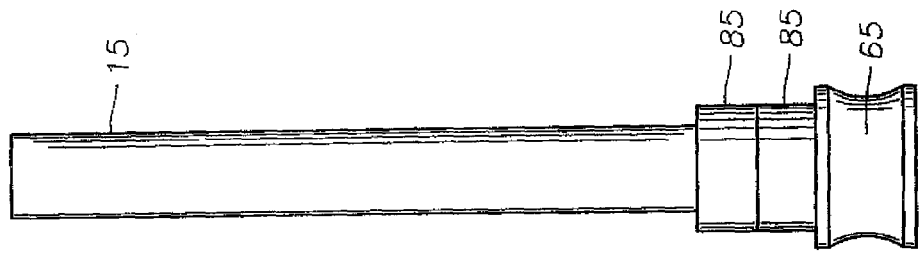
FIG. 11 illustrates a side view of an adjustable-volume liquid dispenser with spacer rings.

In alternative embodiments, the amount of liquid dispensed by adjustable-volume liquid dispenser 5 is not set by plunger lock 60 and groove indentions 95. For instance in alternative embodiments as illustrated in FIG. 11, spacer rings 85 are used to set the desired amount of liquid to be dispensed. Spacer rings 85 are placed on plunger 15 and supported by plunger base 65 to limit the distance at which plunger 15 may travel when dispensing the liquid. Spacer rings 85 may be of the same or different sizes. In such embodiments, each spacer ring 85 represents an amount of liquid to be dispensed. Therefore, to dispense a desired amount of liquid, the corresponding amount of spacer rings 85 are placed on plunger 15. Spacer rings 85 may be placed on plunger 15 by any suitable method. In an embodiment, spacer rings 85 contain an orifice (not illustrated) suitable for allowing plunger 15 to pass therethrough but not allowing plunger base 65 to pass therethrough, and each spacer ring 85 may be slid onto plunger 15 to plunger base 65. Spacer rings 85 are not limited to a ring configuration but may instead have any suitable configuration. In an embodiment in which a total amount of liquid desired to be dispensed through spout 10 is an amount larger than chamber 35 may hold, a suitable number of spacer rings 85 may be used to minimize the amount of compressions of plunger 15 that are needed to obtain the desired liquid amount (e.g., the desired dosage amount). In alternative embodiments (not illustrated), spacer rings 85 may be disposed on plunger 15 outside of chamber 35. In such alternative embodiments, spacer rings 85 may be disposed at any suitable location on plunger 15 to provide the known amount of dispensed liquid.

In alternative embodiments (not illustrated), plunger lock 60 is placed on plunger 15 outside of chamber 35 and above chamber cap 30 and locked into groove indentions 95. In such an alternative embodiment, the downward movement of plunger 15 is stopped when plunger lock 60 contacts chamber cap 30, collar neck 70, and/or any other suitable stop.

In some alterative embodiments (not illustrated), adjustable-volume liquid dispenser 5 includes a counter. The counter may be any device suitable for use with adjustable-volume liquid dispenser 5 and capable of tracking the amount of liquid dispensed, the amount of depressions of plunger 15, and/or a log of when liquid was dispensed. The counter may be located at any suitable location on adjustable-volume liquid dispenser 5. For instance, the counter may be located in chamber cap 30. The counter may be mechanical, electrical, and the like. In some embodiments, for each depression of plunger 15, the counter is activated. In such embodiments, the counter is electrical and in some alternative embodiments may be powered by a solar panel. In an embodiment, the counter is a mechanical counter that may be activated when plunger 15 is depressed. The results of the activation may be visibly displayed on adjustable-volume liquid dispenser 5 or may be disposed within chamber cap 30. In an embodiment, the counter is removeably attached to chamber cap 30. In such an embodiment, the counter may be a mechanical counter, and depression of plunger 15 may physically activate the counter.

In other alternative embodiments (not illustrated), adjustable-volume liquid dispenser 5 includes a lock. The lock may include any lock suitable for preventing unwanted depression of plunger 15. In one embodiment, the lock is a slot within chamber cap 30 that may be twisted to lock plunger 15 in place. In another embodiment, the lock includes a rod that is disposed under spout 10. The lock may swivel at its base and may be disengaged when dispensing liquid. In other embodiments (not illustrated), the lock includes a locking mechanism having a rod or similar configuration. The locking mechanism is attached to a portion of spring 20 and extends lengthwise along plunger 15. As plunger 15 is depressed, the locking mechanism may substantially prevent compression of spring 20. In other embodiments (not illustrated), the locking mechanism may extend from about chamber cap 30 to about spout 10 and may be sufficiently disposed to prevent depression of plunger 15. For instance, a force applied to spout 10 may cause spout 10 to contact the locking mechanism, which prevents depression of plunger 15 as the opposite end of the locking mechanism contacts chamber cap 30. In an alternative embodiment, a cover may be used to plug dispensing end 130 and prevent unwanted dispensing of liquid through spout 10. The cover may be attached to spout 10 by a tether or any other suitable method.

Without limitation, setting the distance that plunger 15 extends into chamber 35 controls the amount of liquid that is dispensed out of spout 10. Therefore, the exact amount of liquid dispensed may be controlled.

Although the present invention and its advantages have been described in detail, it should be understood that various changes, substitutions and alterations may be made herein without departing from the spirit and scope of the invention as defined by the appended claims.

What is claimed is:

1. An adjustable-volume liquid dispenser, comprising:
a spout;
a plunger secured to the spout;
a plunger lock moveable lengthwise along the plunger, wherein the plunger lock is securable to the plunger at a plurality of positions on the plunger to adjust a volume of liquid to be dispensed, and wherein the plunger lock comprises a plunger lock opening, and further wherein the plunger is disposed to pass through the plunger lock opening as the plunger lock is moved lengthwise along the plunger;
a spring in contact with the plunger;
a chamber comprising an interior for containing liquid, wherein the plunger is slidably arranged with the chamber, and wherein a portion of the plunger is disposed within the chamber;
a chamber cap secured to the chamber, wherein the spring is disposed between the spout and the chamber cap;
a collar, wherein the plunger extends into the chamber through the chamber cap and the collar, and wherein the collar comprises a collar neck, and further wherein the collar neck interfaces with the chamber cap;
a valve disposed within the chamber; and
a shaft secured to the chamber.

2. The adjustable-volume liquid dispenser of claim 1, wherein the plunger comprises a plunger base distal to the spout, and wherein the plunger base is disposed in the chamber.

3. The adjustable-volume liquid dispenser of claim 1, wherein the spring is disposed about an exterior of the plunger, and wherein the spring is disposed outside of the chamber.

4. The adjustable-volume liquid dispenser of claim 1, wherein the plunger comprises a plurality of grooves and a plurality of groove indentions, and wherein the plunger lock comprises a plurality of tabs, and further wherein the tabs are disposable within groove indentions to secure the plunger lock at a position on the plunger.

5. The adjustable-volume liquid dispenser of claim 1, wherein each of the plurality of positions represents a volume of liquid to be dispensed.

6. The adjustable-volume liquid dispenser of claim 1, wherein the plunger lock is disposed within the chamber.

7. The adjustable-volume liquid dispenser of claim 1, wherein the collar further comprises a collar base, and wherein the collar base has a diameter and the collar neck has a diameter, and wherein the diameter of the collar neck is less than the diameter of the collar base.

8. The adjustable-volume liquid dispenser of claim 1, wherein a portion of the collar neck extends through the chamber cap and out of the chamber.

9. An adjustable-volume liquid dispenser, comprising: a spout;
  a plunger secured to the spout;
  a spacer ring disposed on the plunger, wherein the spacer ring comprises an orifice through which the plunger passes;
  a spring in contact with the plunger;
  a chamber comprising an interior for containing liquid, wherein the plunger is slidably arranged with the chamber, and wherein a portion of the plunger is disposed within the chamber;
  a chamber cap secured to the chamber, wherein the spring is disposed between the spout and the chamber cap;
  a collar, wherein the plunger extends into the chamber through the chamber cap and the collar, and wherein the collar comprises a collar neck, and further wherein the collar neck interfaces with the chamber cap;
  a valve disposed within the chamber; and
  a shaft secured to the chamber.

10. The adjustable-volume liquid dispenser of claim 9, wherein the spring is disposed about an exterior of the plunger, and wherein the spring is disposed outside of the chamber.

11. The adjustable-volume liquid dispenser of claim 9, wherein the spacer ring is disposed within the chamber.

12. A method for dispensing a liquid from a liquid container, wherein the liquid container contains the liquid, comprising:
  (A) submersing a shaft in the liquid, wherein the shaft is secured to a chamber;
  (B) drawing the liquid into the chamber through the shaft, comprising applying a force to a spout to depress a plunger into the chamber, and removing the force to allow a spring to return the plunger to about an original position, wherein an adjustable-volume liquid dispenser comprises the shaft, the chamber, the spring, and the spout, and further comprises:
    the plunger secured to the spout;
    a plunger lock moveable lengthwise along the plunger, wherein the plunger lock is securable to the plunger at a plurality of positions on the plunger to adjust a volume of liquid to be dispensed, and wherein the plunger lock comprises a plunger lock opening, and further wherein the plunger passes through the plunger lock opening as the plunger lock is moved lengthwise along the plunger, and wherein the plunger lock is disposed within the chamber;
    the spring in contact with the plunger;
    the chamber comprising an interior for containing the liquid, wherein the plunger is slidably arranged with the chamber, and wherein a portion of the plunger is disposed within the chamber;
    a chamber cap secured to the chamber;
    a collar, wherein the plunger extends into the chamber through the chamber cap and the collar, and wherein the collar comprises a collar neck, and further wherein the collar neck interfaces with the chamber cap;
    a valve disposed within the chamber; and
  (C) applying force to the spout to dispense the liquid.

13. The method of claim 12, further comprising setting a maximum amount of liquid to be dispensed.

14. The method of claim 13, further comprising dispensing the maximum amount in one depression of the spout.

15. The method of claim 12, further comprising securing the plunger lock at a lengthwise position on the plunger.

16. The method of claim 15, wherein the plunger lock comprises tabs, and wherein the plunger comprises grooves.

17. The method of claim 16, further comprising moving the plunger lock lengthwise along the plunger to a desired position, wherein the plunger comprises a groove indention.

18. The method of claim 17, further comprising moving the tabs into the groove indention.

19. The method of claim 12, wherein the spring is disposed about an exterior of the plunger, and wherein the spring is disposed outside of the chamber.

20. The method of claim 12, wherein the collar further comprises a collar base, and wherein the collar base has a diameter and the collar neck has a diameter, and wherein the diameter of the collar neck is less than the diameter of the collar base.

* * * * *